United States Patent
DeCost et al.

(10) Patent No.: US 7,356,357 B2
(45) Date of Patent: Apr. 8, 2008

(54) PASSIVE DISPLAY UNIT AND SYSTEM AND METHOD OF USE

(75) Inventors: Norman DeCost, Midlothian, VA (US); Joel Hladecek, Los Angeles, CA (US); Scott Keller, Billerica, MA (US); Frederic Macdonald, Santa Monica, CA (US); Donald C. Miffitt, Chelmsford, MA (US)

(73) Assignee: Modstream, Inc., New York, NY (US)

( * ) Notice: Subject to any disclaimer, the term of this patent is extended or adjusted under 35 U.S.C. 154(b) by 66 days.

(21) Appl. No.: 10/757,577

(22) Filed: Jan. 15, 2004

(65) Prior Publication Data

US 2004/0192399 A1 Sep. 30, 2004

Related U.S. Application Data

(60) Provisional application No. 60/444,646, filed on Feb. 4, 2003, provisional application No. 60/440,323, filed on Jan. 16, 2003.

(51) Int. Cl.
*H04B 1/38* (2006.01)

(52) U.S. Cl. .......................................... 455/566; 705/26

(58) Field of Classification Search ................ 455/566, 455/404.2, 411, 419; 705/26; 340/854.8, 340/854.9
See application file for complete search history.

(56) References Cited

U.S. PATENT DOCUMENTS

| | | | |
|---|---|---|---|
| 4,021,953 A | 5/1977 | Couch | |
| 4,882,724 A | 11/1989 | Vela et al. | |
| 4,930,795 A | 6/1990 | Tannehill et al. | |
| 4,973,952 A | 11/1990 | Malec et al. | |
| 4,988,025 A | 1/1991 | Lipton et al. | |
| 5,158,310 A | 10/1992 | Tannehill et al. | |
| 5,250,789 A | 10/1993 | Johnsen | |
| D341,691 S | 11/1993 | Begum et al. | |
| 5,280,932 A | 1/1994 | Folsom | |
| 5,287,266 A | 2/1994 | Malec et al. | |
| 5,295,064 A | 3/1994 | Malec et al. | |
| 5,361,871 A | 11/1994 | Gupta et al. | |
| 5,406,271 A | 4/1995 | Sonnendorfer et al. | |
| 5,420,606 A | 5/1995 | Begum et al. | |
| 5,630,068 A | 5/1997 | Vela et al. | |
| 5,640,002 A | 6/1997 | Ruppert et al. | |
| 5,836,051 A | 11/1998 | Myers | |
| 5,963,650 A * | 10/1999 | Simionescu et al. | 705/63 |
| 6,012,244 A | 1/2000 | Begum et al. | |
| 6,024,281 A | 2/2000 | Shepley | |
| 6,177,880 B1 | 1/2001 | Begum | |
| 6,323,753 B2 | 11/2001 | Begum | |
| 6,373,884 B1 * | 4/2002 | Byrns | 375/219 |
| 6,484,939 B1 | 11/2002 | Blaeuer | |
| 2001/0028301 A1 * | 10/2001 | Geiger et al. | 340/5.91 |

(Continued)

*Primary Examiner*—Tu Nguyen
(74) *Attorney, Agent, or Firm*—Sonnenschein Nath & Rosenthal LLP (57) ABSTRACT

A device for displaying messages includes a passive display unit having a display screen, a receiver that receives downloaded information and a processor for processing and storing the downloaded information and providing control to the passive display unit. The display system may include a computer which stores information and a transceiver which downloads and stores the information received from the computer. A method of transmitting and displaying information on the passive display unit is also provided.

47 Claims, 4 Drawing Sheets

U.S. PATENT DOCUMENTS

2002/0145038 A1 10/2002 O'Hagan et al.
2002/0158432 A1 10/2002 Wain
2002/0165778 A1 11/2002 O'Hagan et al.
2004/0117196 A1* 6/2004 Brockman et al. ............ 705/1

* cited by examiner

PASSIVE DISPLAY UNIT AND SYSTEM AND METHOD OF USE

CROSS REFERENCE TO RELATED APPLICATIONS

This application claims priority to U.S. provisional application Ser. No. 60/444,646 filed on Feb. 4, 2003 and U.S. provisional application Ser. No. 60/440,323 filed on Jan. 16, 2003, both of which are incorporated by reference in their entirety herein.

BACKGROUND OF THE INVENTION

1. Field of the Invention

The invention generally relates to a passive display unit for displaying text and graphical information such as advertisements and other information, and an accompanying operating system.

2. Background Description

Advertisements, promotions and community information play a critical role in the sale of items and products within a retail environment. Such advertisements may take many different forms from displays to general placards, and other signage. Promotions, on the other hand, may include coupons, rebates and product samples. In either case of advertisements or promotions, it has been found that consumers respond favorably to these marketing devices, thus resulting in increased store sales. Community information may include, for example, community seasonal events.

However, it is desirable to find new marketing devices to encourage the consumer to increase their purchasing in a particular retail environment. For example, neon signage has increased over the years to attract a consumer to a specific retail store. Once in the store the retailer further encourages the consumer to purchase items through the use of public announcements and other sales tactics.

In one known method of advertisement, a printed sign is placed on a shopping cart to encourage the consumer to purchase a certain item. These signs are periodically changed which is very time consuming and expensive since large retailer may have hundreds of shopping carts and the signs must be changed on all of the carts.

To overcome the burdens of changing each sign on each shopping cart, interactive systems have been developed which display advertisements for specific items as the shopping cart is transported through the retail environment. In one approach, an electronic display unit and transceiver is mounted on a cart. Throughout the retail environment are several transmitters programmed with information concerning a specific item of interest, typically near the transmitter. As the consumer approaches a specific item, the receiver on the display will receive a product-specific message transmitted from the transmitter through what is sometimes referred to as a "trigger signal". These display units are also interactive where they allow the consumer to, for example,

- choose between different settings,
- choose different promotions,
- pay for an item at the shopping cart,
- perform calculations,
- input information via keys, bar code readers and scanners so that the consumer may request certain information concerning placement or sale of certain products,
- order items from other areas of the store (such as food from the deli),
- get maps/directions to products in the store, and
- get recipes/recommendations for food preparation.

In more sophisticated systems, the display may allow a consumer to organize a shopping list in accordance with locations of products within a store. This may be accomplished by generating a list in accordance with a cash register tape bearing a bar code. In some other systems, the units may keep track of and record the purchasing habits of a consumer. Some of these systems also act as a redemption coupon device.

In any case, it is known that these interactive systems are expensive and complex. For example, the components supporting these systems such as many transmitters and the like are complex systems which require expensive support. The placement of many wireless transmitters throughout each store is cumbersome, requiring complex installation and maintenance with a high likelihood of interference with in-store IT systems. These systems may even, in fact, interfere with one another causing consumer confusion, mis-information and the like.

In addition, these systems require the consumer to interact with the devices by pushing buttons, swiping I.D. cards, and navigating through on-screen menus to receive content. This has been known to be frustrating to the consumer to the extent that the consumer will no longer interact with the system and, in many, cases completely ignore the display, to the detriment of sales within the retail environment. Also, such systems require the display unit to transmit signals and interact with other devices throughout the store. In some applications, due to interference, these systems do not work properly.

Some of these system lack privacy which is inherent with "personalized" systems. This is considered a significant negative by most shoppers. And "alert" systems (e.g., beeping, flashing, and vibrating to draw attention to certain products) are considered a severe annoyance. These interactive systems are also very delicate, and cannot withstand the high-impact environments and outdoor usage and storage that a shopping cart must endure. Additionally, the inclusion of buttons, additional components and overall device size leads to an increased probability of breakage.

It is also known that these interactive devices have very high power consumption (multiple cells, external battery packs, or built-in rechargeable). This leads to short battery life due to their complex functionality. Additionally, these devices are overly bulky due to their added functionality such as large display screens, numerous buttons, bar code readers, navigation devices, card swipe components, etc. For this reason, and the reasons above, these devices are delicate and not designed to be permanently mounted on the shopping cart handle. Many require the consumer to seek out a device and place it on the cart, or require that the carts remain indoors.

The invention overcomes one or more of these shortcomings.

SUMMARY OF THE INVENTION

In one aspect of the invention, a device for displaying messages includes a passive display unit having a display screen, a receiver that receives downloaded information and a processor for processing and storing the downloaded information and providing control to the passive display unit.

In another aspect of the invention, a display system includes a computer which stores information and a mobile transceiver which downloads and stores the information received from the computer. A passive display unit receives the information stored in the mobile transceiver, at any location, and displays the information on a display screen.

In yet another aspect of the invention, a method is provided for transmitting and displaying information on a passive display unit. The method includes downloading information from a computer system to a fixed or mobile transceiver unit. The transceiver unit transmits the information to a receiver in at least one passive display unit. In embodiments, during the download of the information, the display may cease operations.

DETAILED DESCRIPTION OF EMBODIMENTS OF THE INVENTION

The invention is directed to a passive display system for displaying information such as advertisements, promotions, community information and the like. The passive display may be a programmable display using a single-point mobile or fixed-location transceiver. The mobile transceiver (e.g. wand), may be easily transported to each display unit for programming, unlike traditional systems which are programmed by moving the cart to the transmitter. The fixed transceiver is able to simultaneously program or download information to all of the display units in the retail environment (providing total in-store coverage), within the broadcast range. These two examples are unlike traditional location based systems which are programmed by moving the cart to the transmitter.

Figure 3:
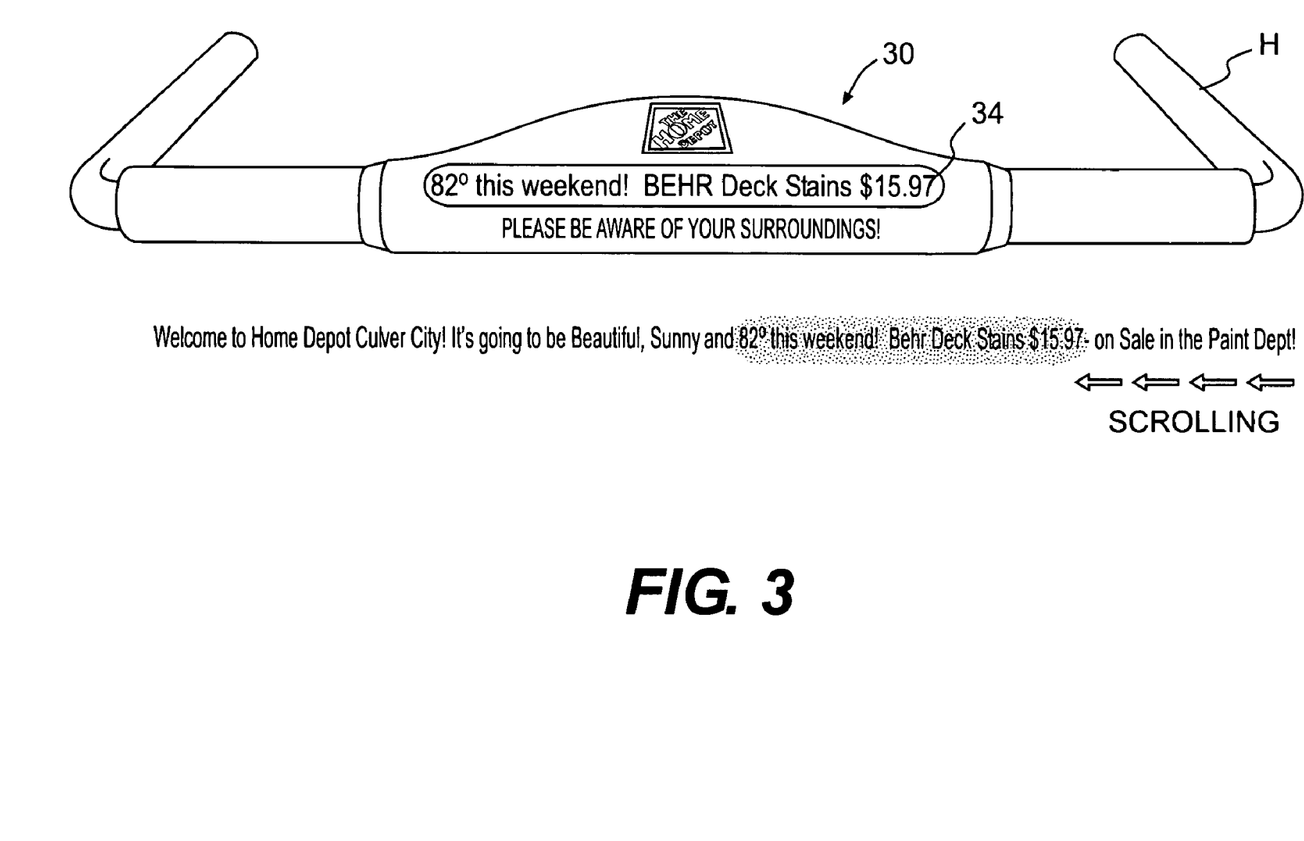
FIG. 3 shows an integrated display device in accordance with the invention.

The display system, in one embodiment, includes a passive display unit attached to or integrally formed with a handle of a shopping cart or other mobile material handling unit (see FIG. 3). The transceiver may be used to program the display unit via infrared coupling or by the use of RF or other transmission technologies. The transceiver may be programmed via a computer at a remote location or within the retail environment. The passive display does not include any user inputs or triggering mechanisms, nor is it activated by any triggering events within the retail environment such as product displays and the like. The display unit, preferably, works independent of any store display or user commands, and does not include a transmitter or other type of signal generator. In one embodiment, the display unit may include a transmitter for message receipt verification. The use of the display system of the invention is also independent of any location within a retail environment.

In implementations of the invention, the display system has been designed with simplicity and ease-of-use. The display unit and accompanying system is less complex and expensive than that of an interactive display systems. The display unit does not include any buttons or other interactive devices which would require input from the user. Thus, messages are delivered to the display without any interaction by the users. Consumption of content is at the user's sole discretion, so messages are embraced more positively.

The entirety of the system is further designed to avoid the need for multiple transmitters and receivers throughout a space and more particularly within a retail environment. Messaging is updated as needed with a single transceiver, e.g., the wand or fixed device, thus minimizing costs. Also, with the mobile transceiver there is no opportunity for interference with in-store IT systems. The display system is designed specifically to withstand outdoor storage conditions, while maintaining functional simplicity, minimal associated parts and components and low profile design to reduce chances of breakage. Also, the simple functionality substantially reduces power requirements, thus requiring smaller batteries and longer service life.

The following are implementations of the display unit and accompanying system. It should be recognized by those of ordinary skill in the art, though, that different implementations are contemplated and may be easily implemented by those of ordinary skill in the art, after reading the disclosure. For example, there may be variations in radio frequencies (RF), transmission and error rates and the like. Thus, the specific features provided herein are illustrative examples and should not be considered limiting features.

The Transceiver

Figure 1:
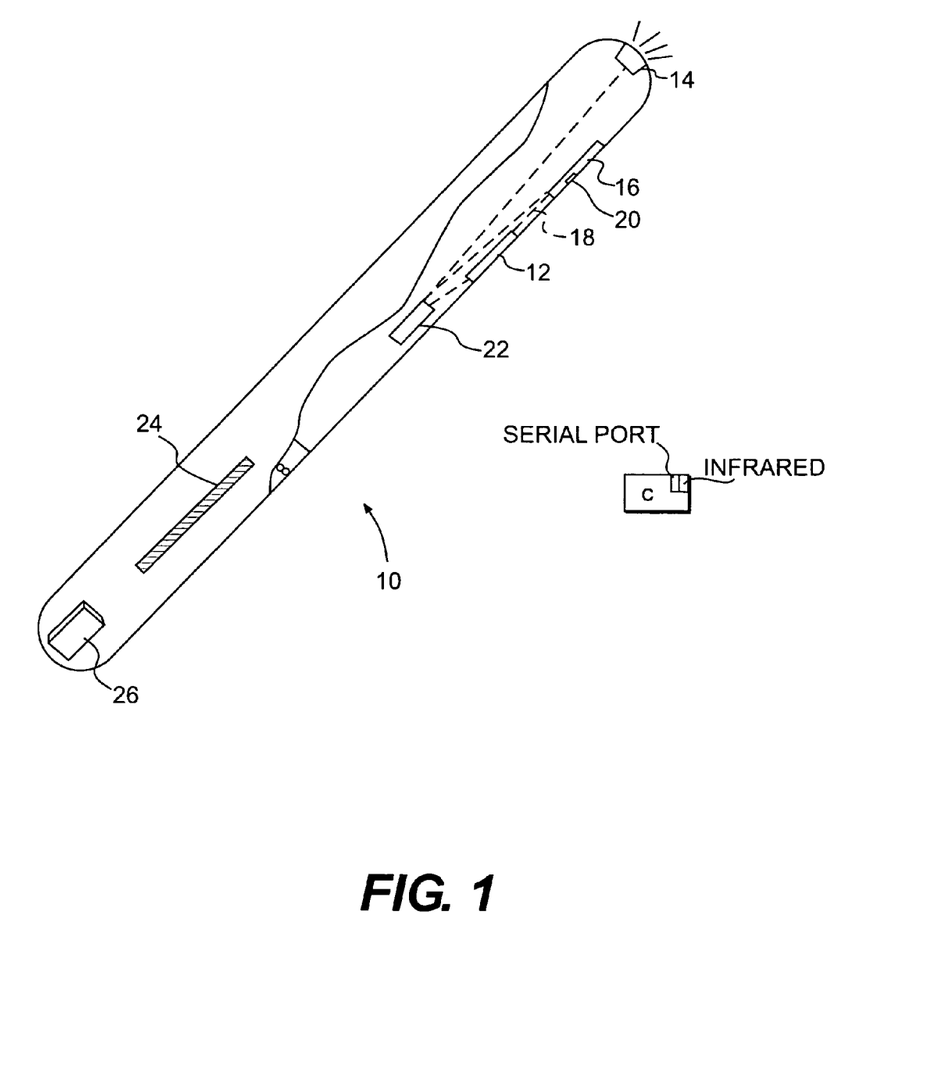
FIG. 1 shows a schematic diagram of the transmitter in accordance with the invention.

Referring to FIG. 1, the system of the invention includes a transceiver depicted as a wand generally designated as reference numeral 10. The transceiver 10 may be at a fixed location within a retail or other environment or may be a mobile transceiver, allowing the operator to program each display system at any location, either simultaneously or separately or any combination thereof. A mobile transceiver may be an off-the-shelf transceiver programmed to perform the following functions. The transceiver may also be a unit of a computer.

In one implementation, the transceiver 10 is designed to operate and remain within specifications over a temperature range of at least 32° F. (0° C.) to 105° F. (40° C.). The transceiver 10 need not operate but will be capable of surviving with no damage through temperatures of at least −4° F. (−20° C.) to 140° F. (+60° C.) with no special handling. The materials and assembly for the transceiver are also designed to be water resistant. The materials and assemblies contemplated for use with the transceiver to achieve the desired operational conditions may include, for example, engineering thermoplastics, gasketed metals, ultrasonic welding processes and other suitable materials and assemblies.

The design of the transceiver may comprise six hardware sections described below. In embodiments, some of the these hardware sections may not be necessary for the implementations of the invention. These hardware components can be easily implemented and incorporated into the transceiver of the invention by those of ordinary skill of the art. The transceiver 10 may be used to program the display unit via infrared coupling or by the use of RF technologies or other transmission technologies. The transceiver may be programmed via a computer at a remote location or within the retail environment by infrared, RF or other wireless mobile communication devices.

1. Receiver

In one embodiment, an internal receiver 12 will receive and decode Flex Protocol as defined within the Flex Protocol Version G1.9 dated Mar. 16, 1998. The receiver 12 will operate, in one embodiment, in the U.S. 900 MHz Frequencies and, more preferably, from 902 MHz to 928 MHz or 929 MHz through 932 Mhz and from 940 Mhz through 941 MHz. The receiver frequency will be easily field programmable and can thus change from the above characteristics.

The receiver 12, in one implementation, is capable of receiving a minimum of four (4) cap codes which may be field programmable. The receiver 12 should have an overall minimum sensitivity of 5 μv/m, and may include a spurious rejection of at least 45 dBc and a selectivity of greater than 65 dB. The received bandwidth should be no greater than 20 kHz and the modulation acceptance should preferably be 4.8 kHz.

Of course, it should be recognized that this is only one implementation of the invention, and that other implementations, including different frequencies and the like are contemplated by the invention. For example, the receiver, of course, may also be implemented using RF and/or infrared technologies. The use of RF and infrared technologies is discussed in detail herein.

2. Transmitter

In one implementation, the transceiver 10 further includes a transmitter 14 designed to communicate at an effective data rate of approximately 115,200 bits per second and be of a sufficient intensity or signal strength to establish an error-free transmission at a distance of 18 inches. Error free in this case is defined to mean an averaged Bit Error Rate (BER) of less than three errors in one million bits.

In one implementation, the transmitter is an infrared transmitter designed to communicate with the display unit, as discussed in more detail below. In another implementation, the transmitter is a RF transmitter designed to communicate with the display unit, as discussed below. Both the infrared and RF may be implemented together, as well.

The transmitter system may additionally perform the following functions:

Initiate (via a phone line) acquisition of new loop data, or receive loop data automatically;

Store loop data locally; and/or

Continually transmit loop data via RF broadcast.

In the RF implementation, the transmitter may have a Frequency Band of 902-928 MHz, and implement Frequency Hopping Spread Spectrum (FHSS) with a RF Power of up to 1 watt. The electrical interface may be an Ethernet-type Modular Connector (power and data). Additionally, the transmitter may include an Omni-directional antenna.

3. Real Time Clock

In one implementation, the transceiver 10 further includes a real time clock 16 designed to be accurate to one part in one million. The clock time will be settable with a command input from the receiver 16 (via a bus 18, for example) or a port 20. The port 20 may also be used to program the transceiver. One of ordinary skill in the art should easily be able to implement and use the real time clock.

4. Central Processing Unit (CPU)

In one implementation, the transceiver 10 also includes a central processing unit (CPU) 22 which can be any known CPU such as those designed by Intel® or Motorola® providing the desired functions. The CPU may include random access memory (RAM) or read only memory (ROM). In the case of ROM, the CPU would be pre-programmed to perform many functions, as discussed below. The CPU may be hardwired, for example, to the components, e.g., 12, 14, 16, etc., of the transceiver 10 to provide functionality and control thereto. The CPU 22 is preferably designed to perform the following functions, as can be implemented and understood by those of ordinary skill in the art.

Receive data from the Flex decoder and the port.

Receive data from phone lines, RF or other types of transmissions.

Authenticate the received data is valid for the transceiver.

Separate data and commands structure packets buffering each for proper inclusion and execution.

Assemble the data in the proper form and sequence for download to the transceiver.

Strobe an LED indicator 24 when a complete valid download exists.

Message and command memory being savable in the event of a power loss or failure.

Contain sufficient memory of various types to properly store at least two complete unique downloads, including, for example, a generic download message, provide any buffering, and an operational code area.

Receive, load, and change to alternate downloaded information such as different scrolling rates, different messages, uploading and/or upgrading the operating system and the like.

Automatic switching between transmitted message downloads on a time-based command.

Continuous transmitting of the Infrared data stream on external command.

Adjust the clock time with a received command.

Store and load cap codes with a time-based command.

Store and change frequency with a time-based command.

One of ordinary skill in the art would be able to program such commands and functions without any undue experimentation.

5. Power Supply

In one implantation, the transceiver 10 may also include a rechargeable or non-rechargeable battery "B" capable of operating the transceiver and components thereof. In one implementation, the battery may operate the components of the transceiver for about seventy-two hours continuously. The LED indicator 24 may be designed to indicate the battery is in need of charging when not more than eight hours of operation remain. Of course, other time limits may also be programmed to begin the strobe.

In an alternate embodiment, the transceiver may work on a 110 V AC power supply source. In this implementation, the transceiver 10 is preferably a single source fixed transceiver.

6. Protected Port Connector

In one implantation, the transceiver 10 may also include a protected port connector 26 to allow the initial parameters (i.e., cap code, receiver frequency, and real time clock) to be viewed and entered, and also allow the various message buffers to be loaded or downloaded. The port speed will be fixed 115,200 bits per second, in one implementation.

Passive Display Device

Figure 2:
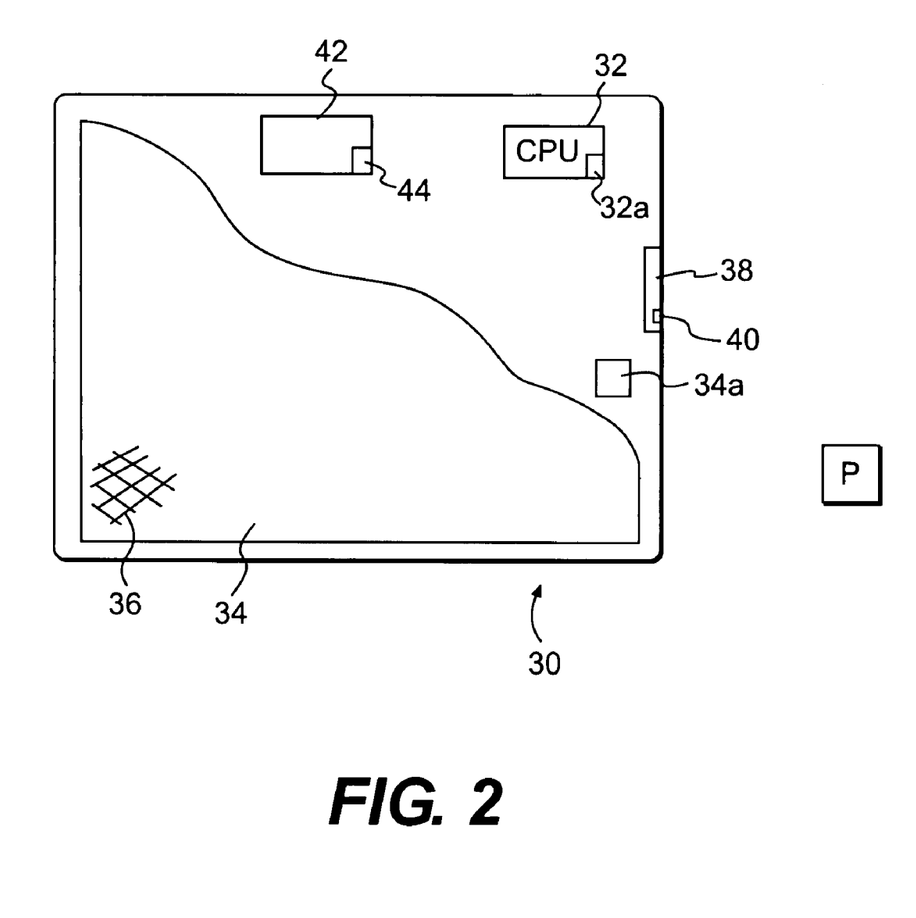
FIG. 2 shows the display device in accordance with the invention.

Referring now to FIG. 2, the display device or unit is shown as reference numeral 30 and is preferably a passive display device, having no interactive buttons or commands for the user. The display device 30, in one implementation, will operate and remain within specifications over a temperature range of at least 32° F. (0° C.) to 105° F. (40° C.). The display device 30 need not operate but will be capable of surviving with no damage through temperatures of at least −4° F. (−20° C.) to 140° F. (+60° C.) with no special handling. The materials for the display device 30 are also designed to be water resistant. The materials contemplated for use with the display device 30 to achieve the desired operational conditions may include, for example, engineering thermoplastics, gasketed metals, ultrasonic welding processes and other suitable materials and assemblies.

The display device 30 includes the hardware sections or combination thereof as described below. The display device is a passive display which receives transmitted information from the transceiver, for example. In one implementation, the display device does not include input user controls; however, the display device may include a transmitter for message verification as well as motion sensors and switches.

1. Logic or Central Processing Unit (CPU)/Motion Sensor

The display device 30 includes a logic or CPU/motion sensor 32 to implement functions of motion detection and power switching, loading the RAM, to provide UART (universal asynchronous receiver-transmitter) services for the asynchronous data from the receiver, and to provide scrolled data for the display unit, preferably an LCD display unit. The contents of the message memory may be composed of at least 6400 characters scrolled at a rate so that the entire message is displayed in 12 minutes, for example. However, other scrolling rates and the like are also contemplated by the invention and the illustrative example above should not be considered a limiting feature.

In one implementation, the UART function is designed to receive infrared data at an effective rate of 115,220 bits per second. When the receiver/UART senses data at the established communications rate, the display may cease, if it is active, while the download occurs. This received data packet, if free of errors, will be directly loaded in the display memory. When a successful download is received the unit will then ignore any erroneous data input and immediately begin displaying the message. After the initial transmission has stopped the display device will again be enabled to receive another download.

The CPU may also include an anti-theft device 32a which will prevent theft of the shopping cart or other mobile material handling unit. The anti-theft device 32a may include a sound alarm or light display or circuitry for activating external devices such as an external wheel-locking mechanism which is activated when the shopping cart or other mobile material handling unit is moved beyond a determined range from a central station or beacon, as is well known in the art of anti-theft devices. For example, the anti-theft device may include a receiver or GPS which will activate an alarm when it no longer receives a signal from a central station or is known to be beyond a certain perimeter. The anti-theft system may also use RF triangulation methods, and may also communicate with the RF system "P" of the retail environment.

In one specific implementation, the CPU may be used to process messages received by RF circuitry, control the LCD or other type of display, including generation message transitions and manage the system's power consumption.

In one implementation, a Texas Instrument MSP430 series microprocessor, specifically targeted at ultra-low power applications is provided. This device has a 16 bit RISC architecture capable of 1 MIPS performance at a supply current of only 200 uA (max). In addition, its supply current is reduced to only 2.8 uA (max) while in low power, time keeping mode.

In implementations, the CPU may spend the majority of its time in low power, timekeeping mode in which all peripherals are shutdown except for a single counter and the 32 kHz oscillator. In this mode, the processor will wake up via an interrupt each time the counter overflows, perform a time check, and go back to sleep. This time-check can be used to query the RF link for message updates at a desired time interval.

Alternatively, a motion detector may be provided such that when it is activated, it will generate a separate interrupt that will cause the CPU to enter the active state. In the active state, the internal clock speed may be increased to 1 MHz or the like via an onboard, digitally controlled oscillator, for example. The processor will remain in the active mode and drive the display as long as the motion sensor continues to generate interrupts. If the microprocessor is not interrupted by the sensor within a predetermined timeout (e.g., 30 seconds), it will shut-off the display and transition back into low power timekeeping mode.

2. Display Module

The display module 34, preferably an LCD display module, in one implementation, is a 40-character single line display in a 5×7 dot matrix. The display may also be, for example, a multiple line display depending on the particular application. The LCD display, in one implementation, is a non-backlit LCD. The display module 34 is driven by an LCD controller, which is an interface between the LCD display and the CPU. The display is designed for temperature operation from at least 32° F. (0° C.) to 105° F. (40° C.), and is UV and water resistant. In an alternative embodiment, the display screen may be, for example, a graphic display such as a plasma display screen, an organic light emitting diode (LED) display or active matrix LCD display.

The display module 34 will receive display information from the CPU 32 and display them, as should be known to those of ordinary skill in the art. For example, the display module may include a loop display, in which the information (many messages or a single message) may be scrolled on the display screen a predetermined amount of times. The information may also be displayed on the screen in other formats. For example, the information may be displayed from left to right, vertically, up and/or down, in a starburst fashion and the like.

In one implementation, the display is updated via an RF link, as discussed throughout. A motion sensor may also be used to activate and deactivate the display, e.g., the display will be automatically turned off within 5 seconds if an additional sensor interrupt is not detected (for power savings).

The display module 34, in one implementation, is fitted with an easily changeable protective cover 36 made from, for example, transparent engineering thermoplastics, that would serve to absorb scratches, blows, and other environmental damage protecting the LCD unit. This may be a snap-on cover, a self adhesive cover or a cover attached by screws or other known mechanical fasteners.

3. Receiver

In one implementation, the display device 30 may include an infrared (or RF) receiver 38 to communicate at an effective data rate of 115,200 bits per second and which is sufficiently sensitive to establish an error-free transmission at a distance of 18 inches. Error-free in this case is defined to mean an averaged Bit Error Rate (BER) of less than three errors in one million bits. The RF receiver may communicate at an effective data rate of about 5,000 to 10,000 bits per second and is sensitive to establish an error-free transmission at a distance of about up to at least 300 yards. The receiver 38 will receive information from the transmitter of the transceiver.

The receiver may also be an RF receiver used to receive broadcast message, i.e., information updates. These updates, if applicable, will be stored by the microprocessor in EEPROM for later retrieval, as needed. The CPU will communicate to the receiver using the same SPI interface used to talk to the EEPROM. This circuitry may be based on RF designs using Micrel Semiconductor RF transceivers, for example.

The receiver 38 may be installed with the appropriate filter(s) 40 in order to ensure that certain words or phrases (profanities) cannot be used with the display. A filter may also be used to filter out infrared noise such as various types of light sources, for example. These are known software and hardware filters, for example.

4. Power Source Module

In one implementation, the display device 30 also includes a power source module 42. The power source module 42 may be implemented with a battery (rechargeable or non rechargeable), photocell or other charging device, and is designed to continually supply power to the display and accompanying components. The battery may be easily replaced and may be accessed via a tool or keyway 44.

The power source module 42 will serve as a power distribution point. A sleep command may also be implemented to turn the device off in order to conserve energy and battery life, if applicable, when the device is not in use. This may be implemented by a motion detector in the CPU, for example, or any well known timer. For example, if the display is mounted to a cart, the display may be activated, automatically, by movement of the cart, via a motion sensor.

Additional Implementations

Figure 4:
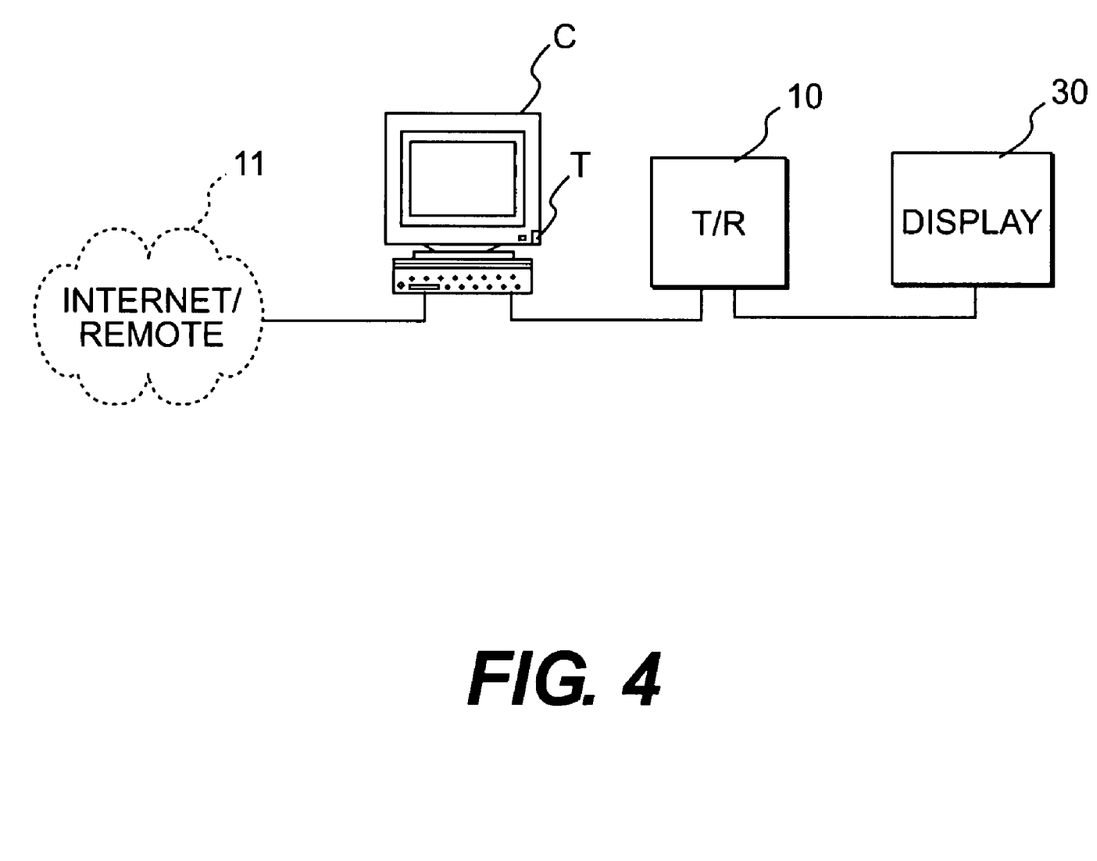
FIG. 4 shows another embodiment of the invention.

FIG. 4 shows additional implementations of the invention. In this embodiment, the computer "C" may receive and download information from a remote location 11 such as the internet, via email, telephone, cell phone or other remote devices. There thus may be a web interface with the system of the invention. This transmission may also include receipt of information via RF, paging technologies or other transmissions. This downloaded information may also be received from an intranet such as LAN or WAN, for instance. This downloaded information may then be transmitted to the transceiver 10 at a fixed location or the passive display unit within a retail environment such as within a store, via a radio frequency (RF) transmitter broadcasts at a high RF frequency (e.g., 400 to 900 MHz). It should be understood that the transceiver may be a unit located within the computer, itself. This is accomplished by having an RF transmitter "T" associated with the computer "C", implemented in a known manner.

The transceiver will then broadcast this signal, via RF, to the display device 30. The signal may also be transmitted via technologies such as infrared, paging or other known transmission types. The display device, instead of or in conjunction with the IR receiver, will have an RF receiver in order to receive the signal. The RF signal, much like the IR signal or other transmission medium, will then be converted, in a known manner, into an output signal which can then be displayed on the display screen. In one embodiment, the receiver of the passive display unit will receive and decode Flex Protocol as defined within the Flex Protocol Version G1.9 dated Mar. 16, 1998.

The computer "C", may include code stored in a solid state Compact Flash card, with no moving parts for storage. The software may include the following responsibilities, as can be implemented by a programmer of ordinary skill:

Periodically connect to a local ISP (internet service provider) number and establish an internet connection.

Maintain and use a list of alternate dialup numbers in case the main number does not work.

Synchronize time with a centrally located server at the start of each polling cycle.

Establish an authenticated and encrypted secure communications channel back to the centralized site using TCP/IP.

Exchange data with the central server to acquire new information to be broadcast.

Exchange data with the central server to report back errors or other conditions of note.

Exchange data with the central server to be instructed about when to poll for new data again.

Disconnect from the central server, disconnect from the local ISP.

Maintain a facility to allow direct dial-in access from another modem, and do this in a secure fashion. Unix shell access will be the interface provided at this stage.

Continually perform the following loop with the saved current set of messages:

Go through each message in the saved message loop one by one;

Evaluate each message to review whether it is current given the current time and date; and If it is still current, packetize it and send it to the RF transmitter unit.

The features shown in FIG. 4 may equally be used with the features shown in FIGS. 1-3.

In addition, it should be understood that the computer "C" may be eliminated at the retail environment level and that paging, RF or other transmission technologies may be downloaded from a remote location directly to the display unit. This may be accomplished by using a paging tower, cellular tower using known technologies such as CDMA, which would then transmit the information directly to the display unit. These transmission technologies may be considered as the transceiver.

Method of Using the System of the Invention

The system of the invention may be used with a shopping cart in order to display messages to a consumer during the shopping experience. In one implementation, as shown in FIG. 3, the display unit may be integrated into the handle of a shopping cart.

In one illustrative example, the transceiver may be preprogrammed with a message via a computer download with computer "C". The computer "C" may have an infrared communication port or a feed to program the transceiver. Alternatively, an RF signal may be used to program the transceiver, whether it is a fixed or mobile device. The message is programmed either via an infrared communication or a port or RF signal, for example. Once the download is complete, the transceiver is then used to program the display unit to scroll a message. Several messages may be downloaded and stored within the memory of the display device. These several messages may be displayed in sequence, or a single message may be repeated, or any combination thereof.

The display may be activated upon movement of the shopping cart or be preset on a timer. In the former scenario, once the consumer moves the cart, the display will be activated. The display may include, for example, advertisements or other useful information for the user such as promotional information.

In one implementation, the use of the display unit will not interfere with any electronics within the store since it is self-contained. The transceiver, for instance, will be used in fairly close proximity to the display unit and more specifically the receiver of the display, itself. The transceiver is also programmed via the computer system. Messages can be intermittently or regularly changed via the method described above.

While the invention has been described in terms of embodiments, those skilled in the art will recognize that the invention can be practiced with modification within the spirit and scope of the appended claims.

Having thus described our invention, what we claim as new and desire to secure by Letters Patent is as follows:

1. A device for displaying information in a retail environment, comprising:
    a passive, mobile display unit having a display screen that displays the information without user interaction;
    a receiver that receives downloaded information;
    a processor for processing and storing the downloaded information received by said receiver and providing control to said passive, mobile display unit to display the downloaded information as the information on said display screen; and
    a motion sensor configured to activate said display screen.

2. The device of claim 1, wherein said display screen comprises one of a single line, multiple line or graphic display.

3. The device of claim 1, wherein said processor comprises memory for storing at least the information.

4. The device of claim 1, wherein said receiver includes at least one of an infrared port, radio frequency (RF) port and a cellular port to receive the downloaded information.

5. The device of claim 4, wherein while receiving the downloaded information, said processor one of ceases display operations and activates said display screen when the download is completed, said display screen continues to display the information, and said display screen displays default information loaded in a memory of said display unit until the download is completed.

6. The device of claim 1, wherein after a successful download is received said passive display unit is configured to disregard any erroneous data input and begin displaying the information on said display screen.

7. The device of claim 1, further comprising an anti-theft device.

8. The device of claim 7, wherein said anti-theft device comprises a global positioning system or RF triangulation system configured to determine location.

9. The device of claim 7, wherein said anti-theft device comprises at least one of a sound alarm, light alarm or circuitry for activating a wheel-locking mechanism that is activated when said passive display unit is moved beyond a predetermined range from a central location.

10. The device of claim 1, wherein said display screen is one of a plasma display, an organic light emitting diode (LED) display and a LCD display.

11. The device of claim 1, wherein said receiver is one of an infrared or radio frequency (RF) receiver.

12. The device of claim 11, wherein said receiver comprises said RF receiver and said RF receiver communicates at an effective data rate of about 5,000 to 10,000 bits per second and is sensitive to establish an error-free transmission at a distance of at least 300 yards.

13. The device of claim 1, further comprising a power module to power said display screen, processor, and receiver.

14. The device of claim 13, wherein said power module includes a sleep command to conserve energy and battery life.

15. The device of claim 1, wherein said passive display unit is not activated via a trigger signal.

16. The device according to claim 1 wherein the display unit is configured to display the information as transitioning text regardless of the location of the device within the retail environment.

17. The device according to claim 1 wherein the display unit is configured to randomly display regardless of the location of the device within the retail environment.

18. The device according to claim 1 wherein the device does not include a transmitter.

19. A passive display system for a retail environment, comprising:
    a computer that downloads and stores information;
    a transceiver that downloads and stores the information received from said computer; and
    a passive, mobile display unit that receives the information stored in said transceiver, at any location within the retail environment, and displays the information on a display screen without user interaction, said display unit configured to not include user inputs, configured to not include triggering mechanisms and configured to not be responsive to triggering mechanisms; and
    a motion sensor to activate the display screen;
    wherein the display unit is configured to randomly display regardless of a location of the device within the retail environment.

20. The system of claim 19, wherein said passive, mobile display unit is programmed by said transceiver independent of any location of said passive, mobile display.

21. The system of claim 19 wherein said transceiver is one of a mobile and a fixed transceiver.

22. The system of claim 21, wherein said mobile transceiver includes:
    an internal receiver that receives the information from said computer;
    an infrared transmitter for transmitting the information to the passive display unit;
    a processing unit that controls functions of the internal receiver and said infrared transmitter; and
    a protected port connector configured to allow initial parameters to be entered, and allow various message buffers to be downloaded into said mobile transceiver.

23. The system of claim 22, wherein said processing unit is preprogrammed to at least one of:
    (i) separate data and commands structure packets buffering each for proper inclusion and execution;
    (ii) assemble the data in form and sequence for download;
    (iii) save the information in the event of a power loss or failure;
    (iv) store at least two complete unique downloads;
    (v) receive, load, and change to alternate operational software on command;
    (vi) switch between transmitted message downloads on a time-based command;
    (vii) continuously transmit the data on external command;
    (viii) adjust the clock time with a received command;
    (ix) store and load cap codes with the time-based command; and
    (x) store and change frequency with the time-based command.

24. The system of claim 19, wherein said passive, mobile display unit includes a RF receiver, and said transceiver receives the information from said computer; and
said transceiver comprises an RF transmitter for transmitting the information to said passive, mobile display unit, wherein said transceiver is one of a fixed and mobile transceiver.

25. The system of claim 19, wherein said passive, mobile display unit includes:

an infrared receiving unit that receives the information from said transceiver; and a processing unit that processes the information from said transceiver.

26. The system of claim 25, wherein said processing unit includes an anti-theft unit.

27. The system of claim 19, wherein said display screen is one of (i) a single or multiple line LCD display screen, (ii) a plasma display screen, (iii) a graphical display, (iv) an organic light emitting diode (LED) display and (v) a LCD display.

28. The system of claim 19, wherein:

during the download of the information, said processor one of ceases display operations and activates said display screen when the download is completed, said display screen continues to display the information, and said display screen displays default information loaded in a memory of said display unit until the download is completed; and after a successful download is received said passive display unit ignores any erroneous data input and begins displaying the information.

29. The device according to claim 19 wherein the display unit is configured to display the information as transitioning text regardless of a location of the device within the retail environment.

30. The device according to claim 19 wherein the device does not include a transmitter.

31. A passive display system, comprising:

a computer which downloads and stores information;

a transceiver which downloads and stores the information received from the computer; and a passive, mobile display unit which receives the information stored in the transceiver, at any location, and displays the information on a display screen;

wherein the transceiver is one of a mobile and a fixed transceiver;

wherein the mobile transceiver includes:

an internal receiver that receives the information from the computer;

an infrared transmitter for transmitting the information to the passive display unit;

a processing unit that controls functions of the internal paging receiver and the infrared transmitter; and a protected port connector to allow initial parameters to be entered, and allow various message buffers to be downloaded into the mobile transceiver;

wherein the internal receiver is field programmable and is capable of receiving a minimum of four (4) cap codes.

32. A passive display system for a retail environment, comprising:

a computer that stores and transmits information;

a remote off-site transceiver receiving and transmitting the information received from said computer; and a passive, mobile display unit that receives the information from said transceiver, and displays the information on a display screen without user interaction, and said display unit configured to not include user inputs, configured to not include triggering mechanisms, and configured to not be responsive to triggering mechanisms; and a motion sensor to activate the display screen;

wherein the display unit is configured to randomly display regardless of a location of the device within the retail environment.

33. The device according to claim 32 wherein the display unit is configured to display the information as transitioning text regardless of a location of the device within the retail environment.

34. The device according to claim 32 wherein the device does not include a transmitter.

35. A method of transmitting and displaying information on a passive display unit in a retail environment, comprising the steps of:

providing a display unit configured to not include user inputs, configured to not include triggering mechanisms and configured to not be responsive to triggering mechanisms;

activating the display unit using a motion sensor;

downloading information from a computer system to a mobile transceiver unit;

placing the mobile transceiver unit in proximity to the passive display unit;

transmitting the information from the mobile transceiver unit to a receiver in the at least one passive display unit; and automatically displaying the information on a display screen of the at least one passive display unit, wherein said step of automatically displaying comprises automatically randomly displaying regardless of a location of the display unit within the retail environment.

36. The method of claim 35, further comprising the step of ceasing display operations during the download of the information.

37. The method of claim 35, wherein during the download of information, the display screen continues to display the information.

38. The method of claim 35, wherein during the download of information, the display screen displays default information loaded in memory of the display unit until the download is completed.

39. The method of claim 35, further comprising activating the display screen when the download is completed and disregarding erroneous data input.

40. The method of claim 35, wherein the downloaded information may be downloaded from one of (i) the internet, (ii) an internet, (iii) a telephone connection, (iv) an email system and (vi) a wireless connection.

41. The device according to claim 35 wherein said step of automatically displaying comprises automatically displaying the information as transitioning text regardless of a location of the display unit within the retail environment.

42. The method according to claim 35 wherein said step of automatically displaying comprises automatically displaying the information as transitioning text.

43. A method of transmitting and displaying information on at least one passive display unit in a retail environment, comprising the steps of:

providing at least one display unit configured to not include user inputs, configured to not include triggering mechanisms and configured to not be responsive to triggering mechanisms; downloading information to a computer system and receiving the downloaded information to a single transceiver unit;

activating the display unit using a motion sensor;

transmitting the information from the single transceiver unit to a receiver in the at least one passive display unit regardless of a location of the at least one passive display unit within the retail environment; and automatically displaying the information on a display screen of the at least one passive display unit, wherein said step of automatically displaying comprises automatically randomly displaying regardless of a location of the display unit within the retail environment.

44. The method of claim 43, further comprising the step of ceasing display operations during the download of the information.

45. The method of claim 43, wherein the downloaded information may be downloaded from one of (i) the internet, (ii) an internet, (iii) a telephone connection, (iv) an email system and (v) a wireless connection.

46. The method according to claim 43 wherein said step of automatically displaying comprises automatically displaying regardless of a location of the display unit within the retail environment.

47. The method according to claim 43 wherein said step of automatically displaying comprises automatically displaying the information as transitioning text.

* * * * *